United States Patent
Joong et al.

(10) Patent No.: US 6,975,055 B2
(45) Date of Patent: Dec. 13, 2005

(54) DYNAMO-ELECTRIC MACHINE HAVING A ROTOR WITH FIRST AND SECOND AXIALLY OR ROTATIONALLY DISPLACEABLE FIELD MAGNETS

(75) Inventors: Kim Houng Joong, Hitachi (JP); Shigeta Ueda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 09/977,384

(22) Filed: Oct. 16, 2001

(65) Prior Publication Data

US 2002/0117926 A1    Aug. 29, 2002

(30) Foreign Application Priority Data

Feb. 28, 2001 (JP) .............................. 2001-053425

(51) Int. Cl.[7] .......................... H02K 1/00; H02K 21/12
(52) U.S. Cl. ................... 310/156.01; 310/114; 310/119
(58) Field of Search .......................... 310/46, 255, 254, 310/273, 261, 114, 209, 191, 156.25, 156.24, 310/156.16, 156.17, 156.18, 156.08, 156.01; 290/40 C

(56) References Cited

U.S. PATENT DOCUMENTS

| | | | | |
|---|---|---|---|---|
| 5,177,391 A | * | 1/1993 | Kusase ........................ 310/263 |
| 5,369,322 A | * | 11/1994 | Maruyama et al. ........... 310/39 |
| 5,387,061 A | * | 2/1995 | Barkman et al. ............. 409/80 |
| 5,397,951 A | * | 3/1995 | Uchida et al. ......... 310/156.21 |
| 5,562,528 A | * | 10/1996 | Ueyama et al. ............... 451/11 |
| 5,763,977 A | | 6/1998 | Shimasaki et al. |
| 5,821,710 A | * | 10/1998 | Masuzawa et al. ......... 318/254 |
| 6,252,323 B1 | * | 6/2001 | Nishikawa et al. .... 310/156.01 |
| 6,508,614 B1 | * | 1/2003 | Ozaki et al. ................. 409/231 |
| 6,541,877 B2 | * | 4/2003 | Kim et al. ..................... 290/44 |
| 6,577,022 B2 | * | 6/2003 | Joong et al. ............. 290/40 C |
| 6,771,000 B2 | * | 8/2004 | Kim et al. .................. 310/209 |
| 6,833,646 B2 | * | 12/2004 | Joong et al. ................ 310/114 |
| 6,841,911 B2 | * | 1/2005 | Kim et al. .................... 310/114 |
| 2002/0047319 A1 | * | 4/2002 | Ferrari et al. ................. 310/12 |
| 2002/0116961 A1 | * | 8/2002 | Kim et al. .................... 68/23.7 |
| 2002/0117922 A1 | * | 8/2002 | Kim et al. .................. 310/114 |
| 2002/0117926 A1 | * | 8/2002 | Joong et al. ................ 310/191 |
| 2002/0117927 A1 | * | 8/2002 | Kim et al. .................. 310/191 |
| 2002/0117933 A1 | * | 8/2002 | Joong et al. ................ 310/261 |
| 2002/0158520 A1 | * | 10/2002 | Takamune et al. ............ 310/20 |
| 2003/0102674 A1 | * | 6/2003 | Joong et al. ............. 290/40 C |

FOREIGN PATENT DOCUMENTS

| | | |
|---|---|---|
| EP | 0 413 337 | 2/1991 |
| EP | 0 413 377 A1 | 2/1991 |
| EP | 0 483 372 | 5/1992 |
| EP | 0 483372 A1 | 5/1992 |
| EP | 1 085 644 | 3/2001 |
| JP | 2000-155262 | 6/2000 |

* cited by examiner

OTHER PUBLICATIONS

Chinese Patent Office Action dated Oct. 15, 2004.

*Primary Examiner*—Darren Schuberg
*Assistant Examiner*—Heba Elkassabgi
(74) *Attorney, Agent, or Firm*—Crowell & Moring LLP

(57) ABSTRACT

A dynamo-electric machine has a stator with a primary winding and a rotor with a field magnet and a shaft. the field magnet includes a first field magnet having diferent polarity magnetic poles sequentially arranged in a rotation direction and a second field magnet having diferent polarity magnetic poles sequentially arranged in a rotation direction. The machine further has a mechanism for shifting the first and the second field magnets in axial and rotation directions.

19 Claims, 17 Drawing Sheets

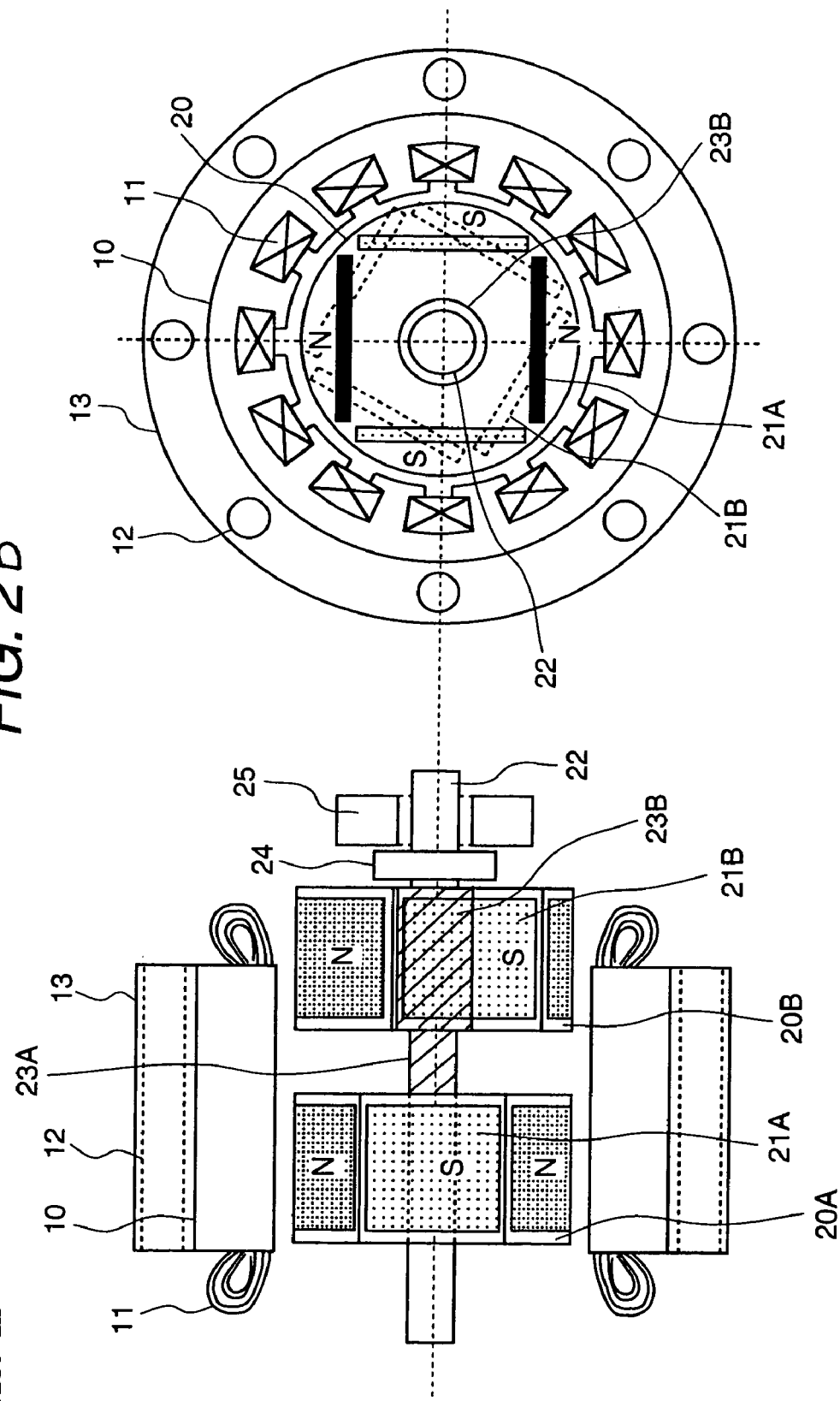

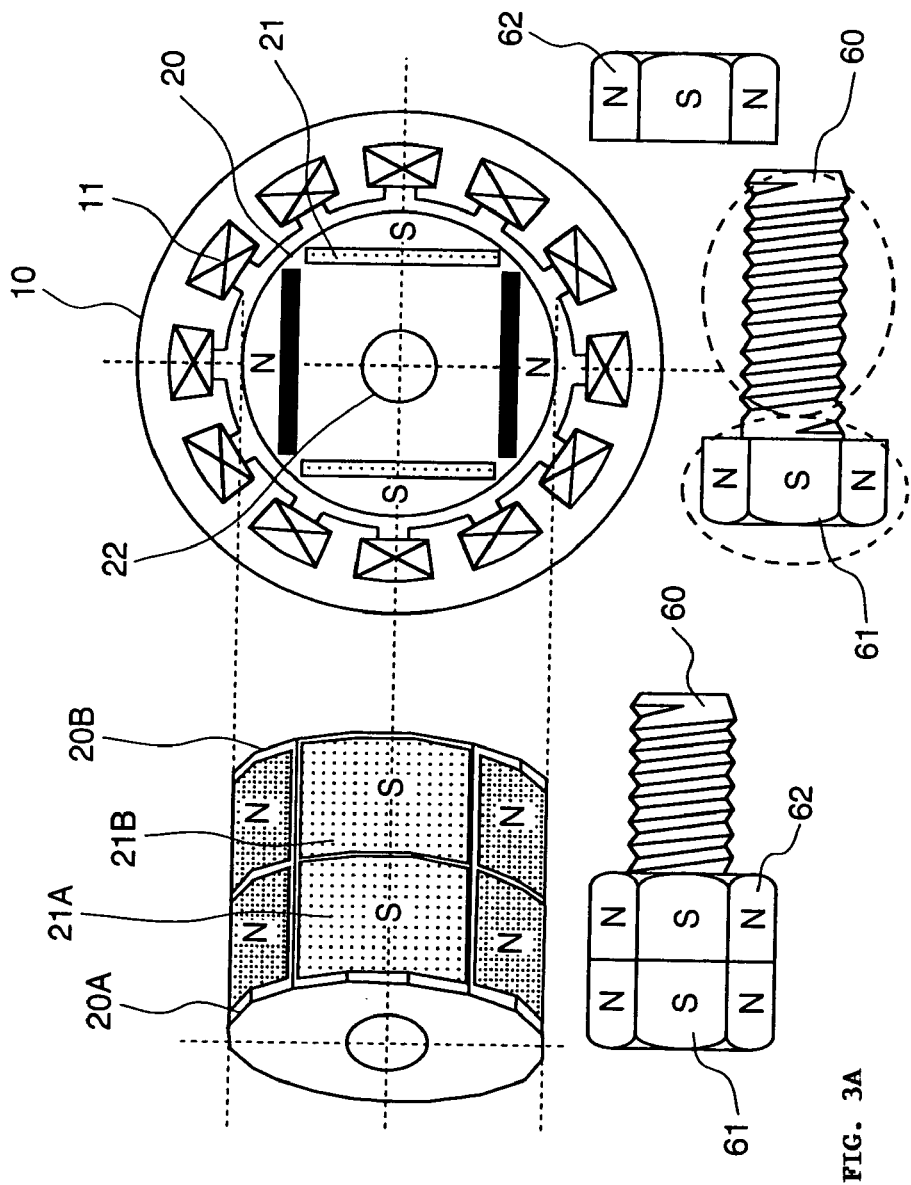

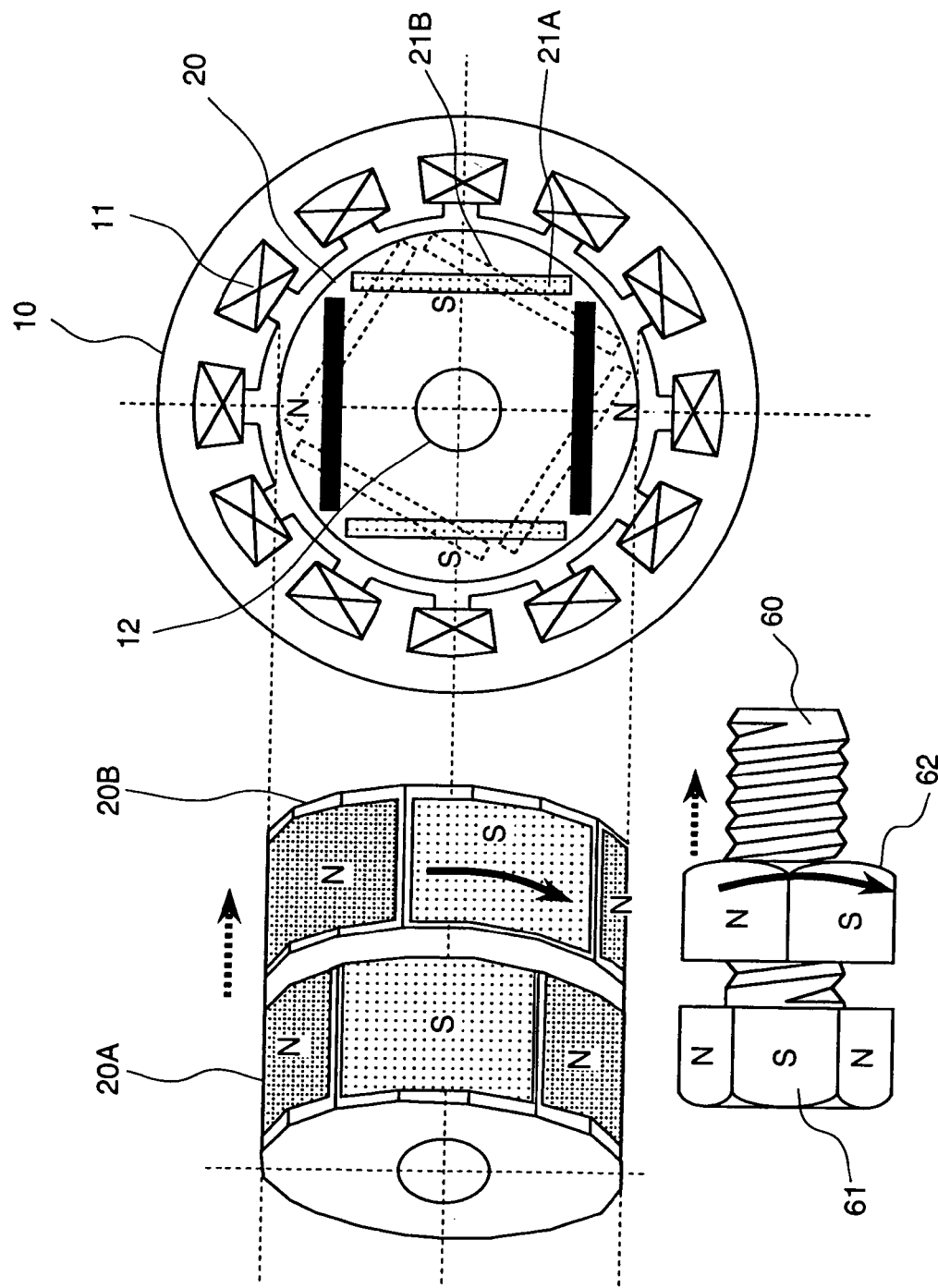

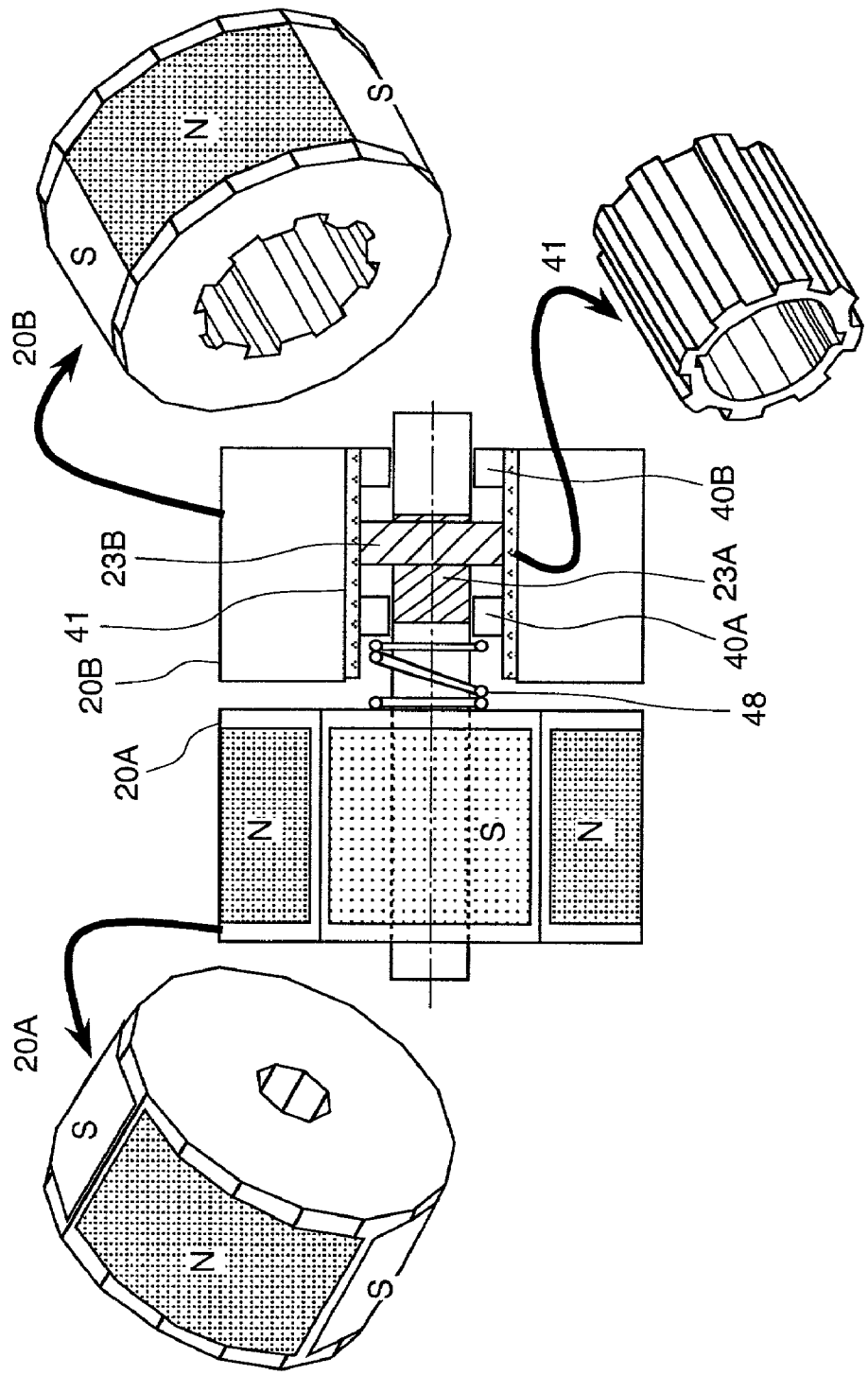

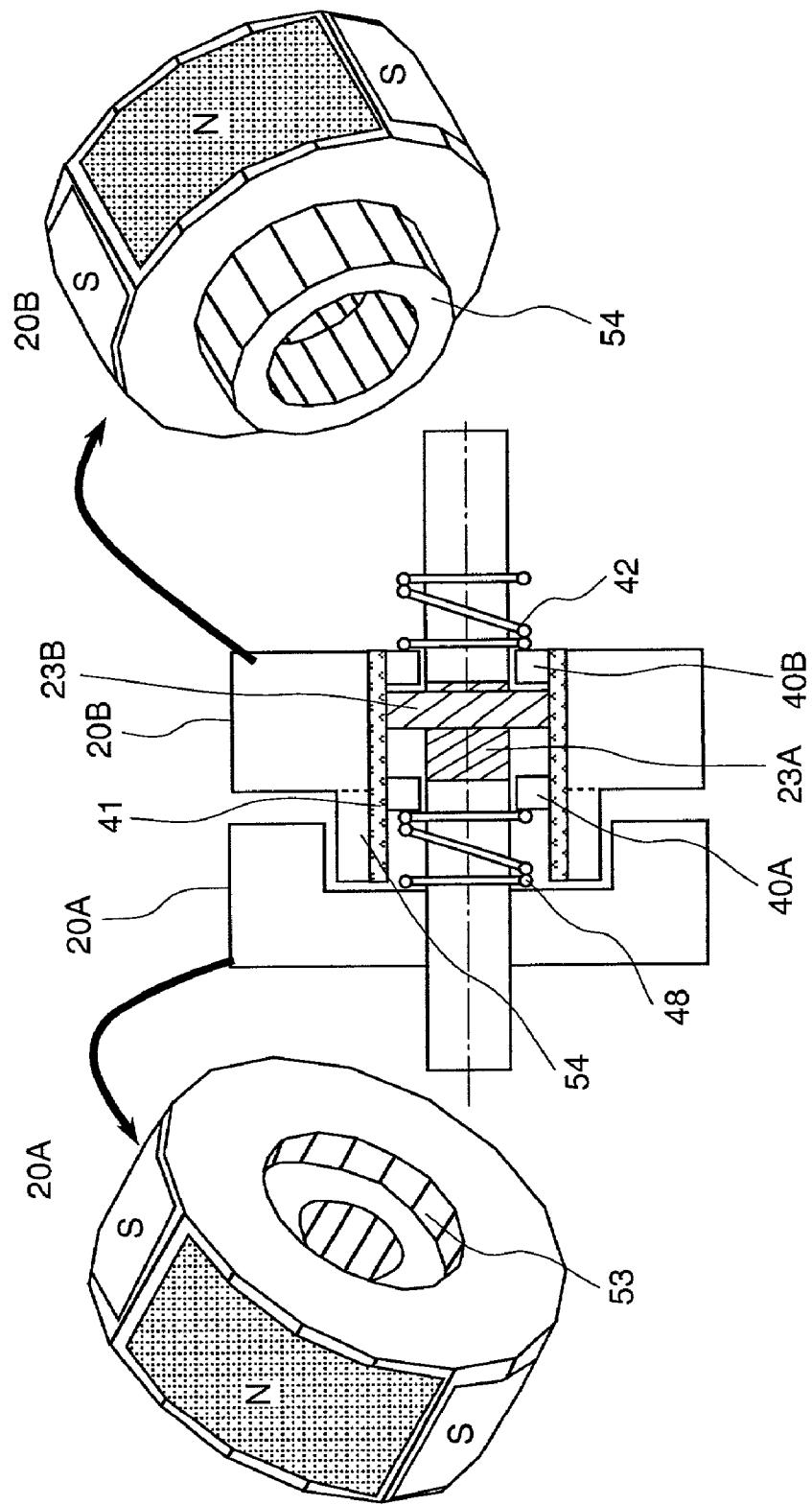

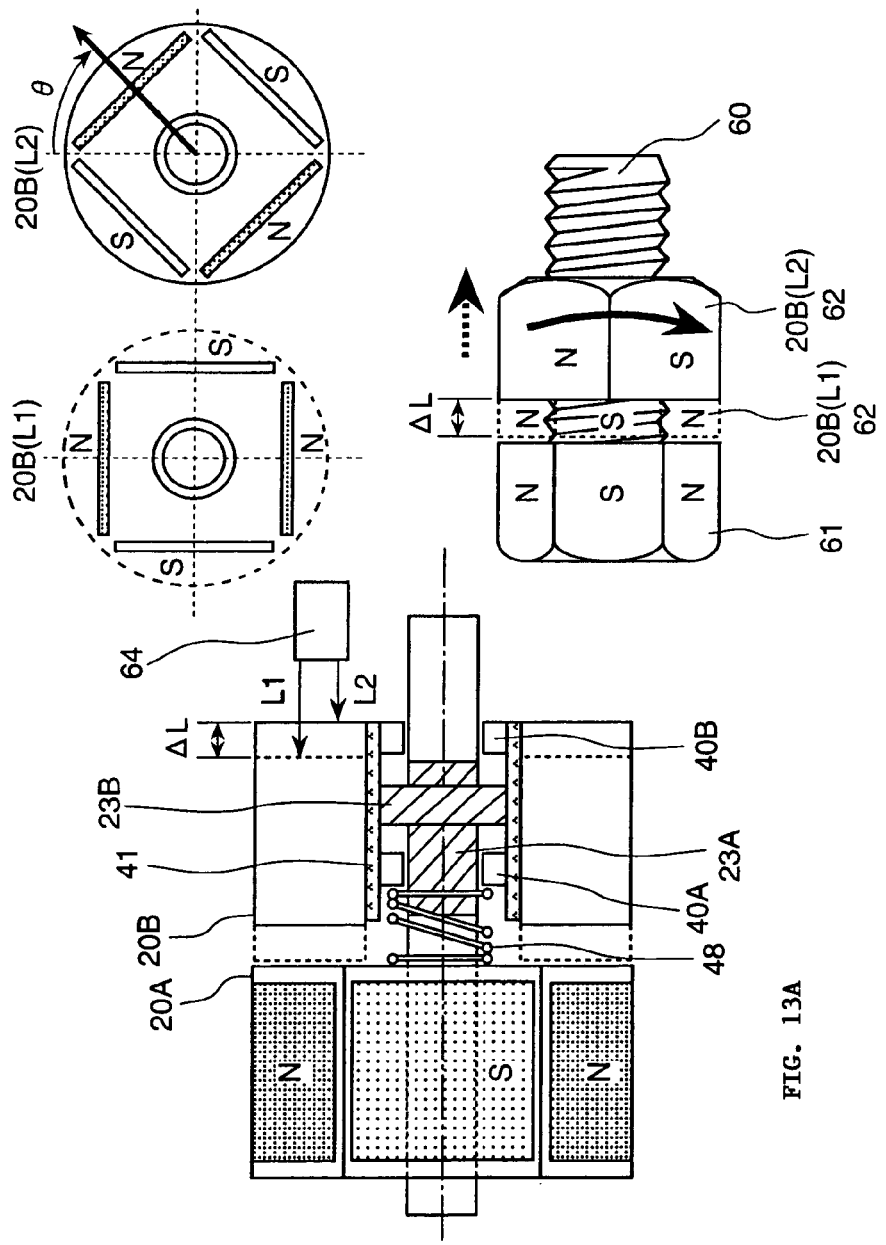

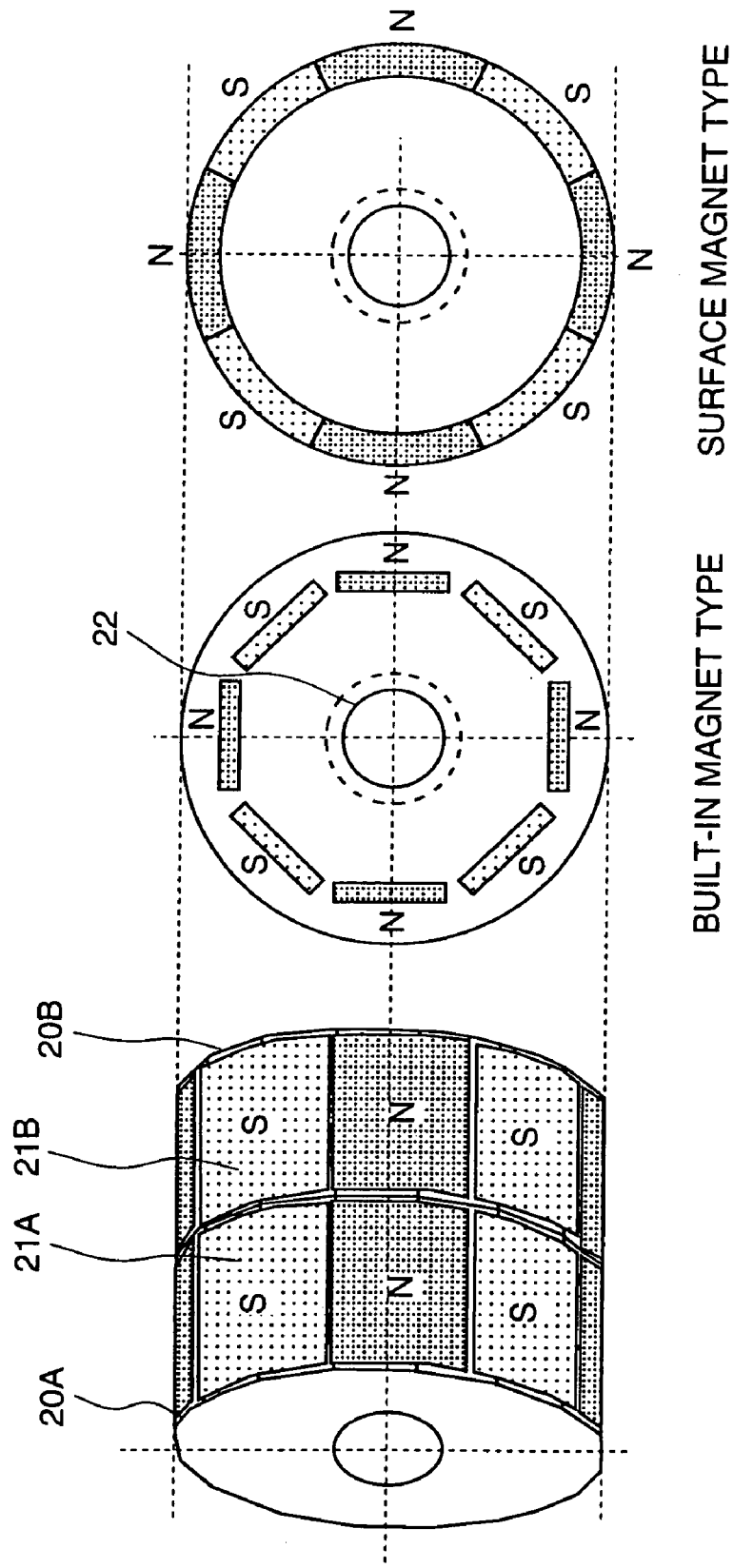

FIG. 18A
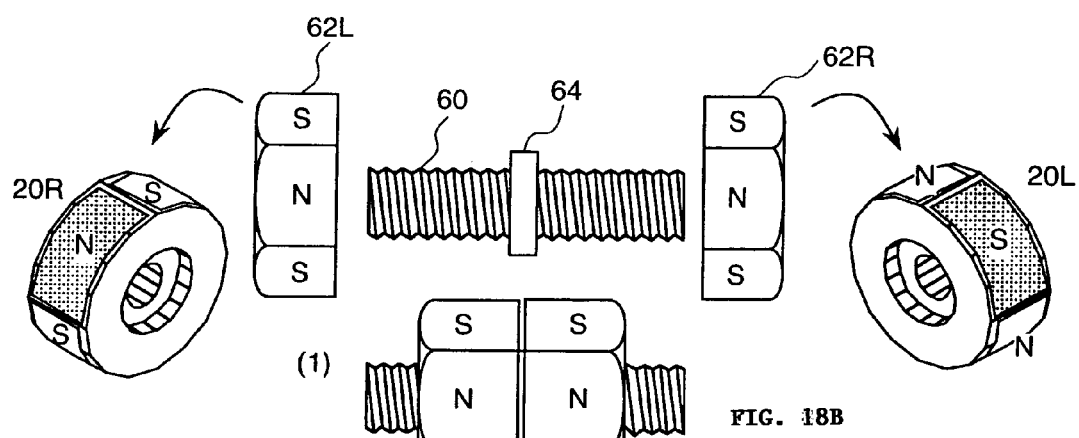
FIG. 18B
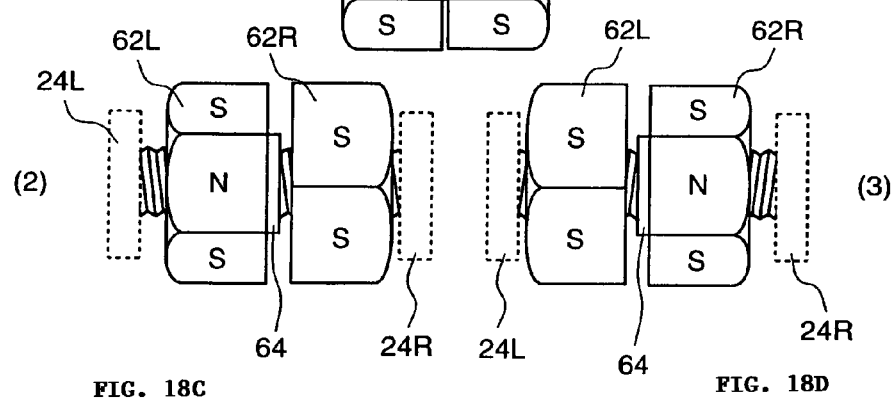
FIG. 18C          FIG. 18D

FIG. 19A
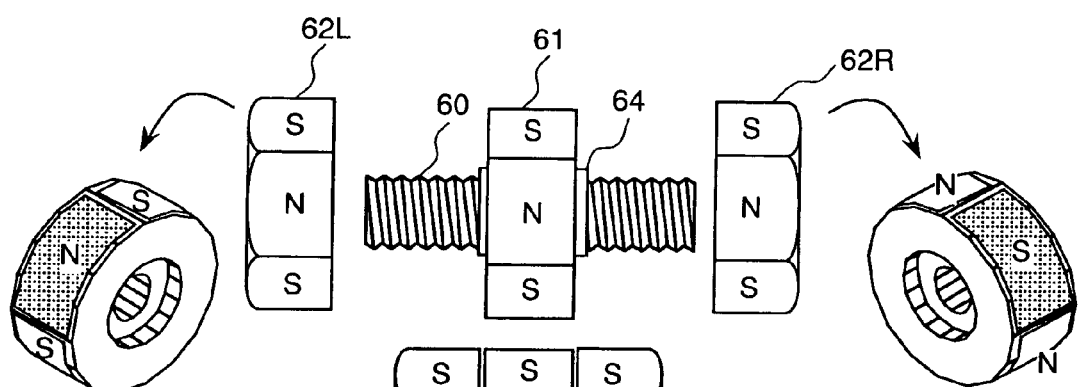
FIG. 19B
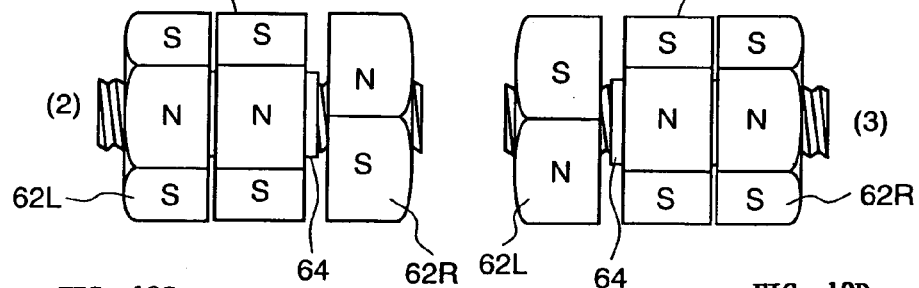
FIG. 19C  FIG. 19D

FIG. 20A
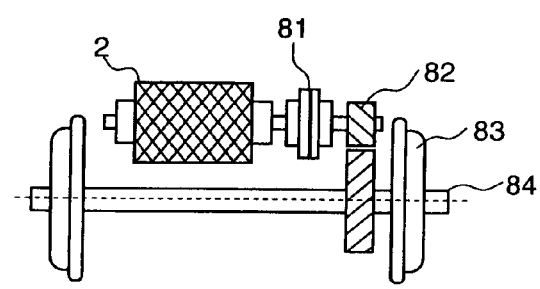
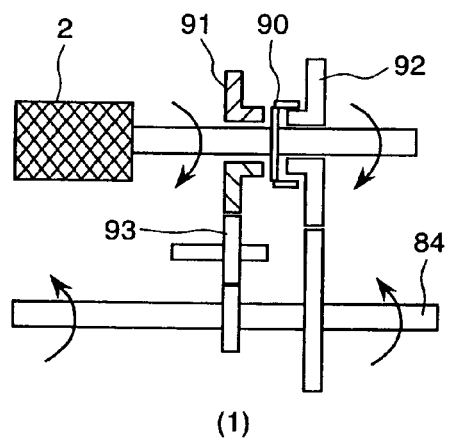
(1)
FIG. 20B
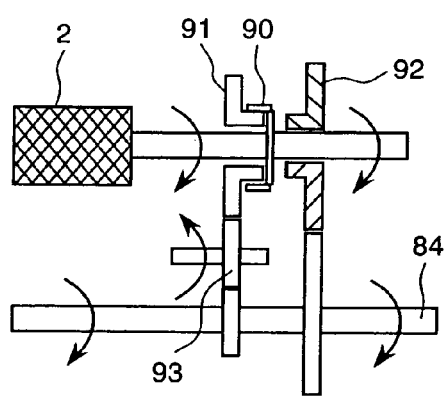
(2)
FIG. 20C

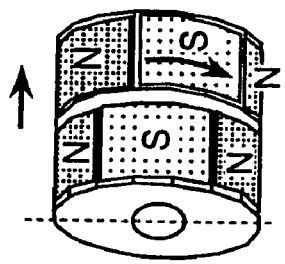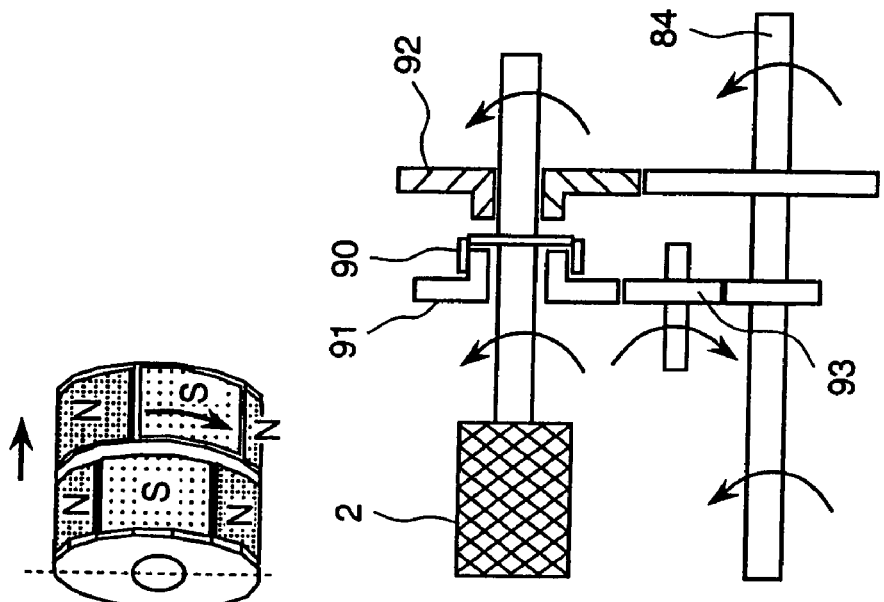
FIG. 21A
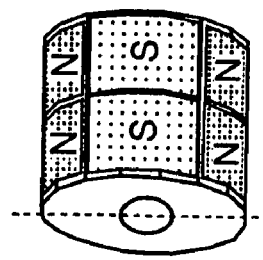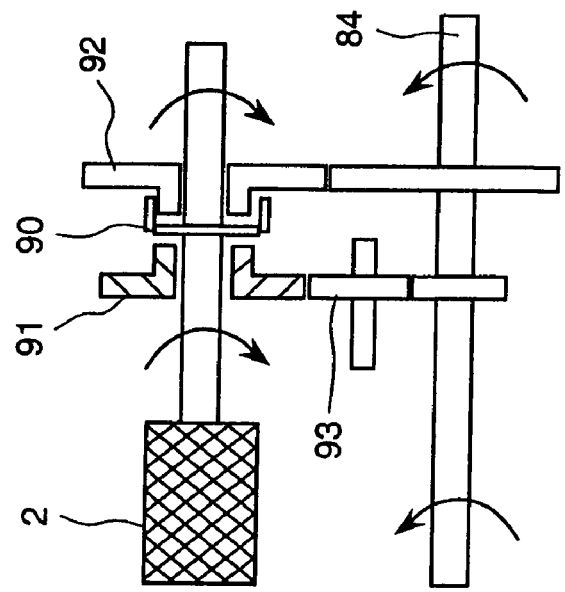
FIG. 21B

DYNAMO-ELECTRIC MACHINE HAVING A ROTOR WITH FIRST AND SECOND AXIALLY OR ROTATIONALLY DISPLACEABLE FIELD MAGNETS

BACKGROUND OF THE INVENTION

The present invention relates to a dynamo-electric machine which uses a permanent magnet for field system, and particularly to a method and a dynamo-electric machine for performing the drive and regeneration in a carrier system or transport system.

In a permanent magnet field type dynamo-electric machine of the prior art, an induced electromotive force E is determined by a constant magnetic flux Φ generated by a permanent magnet arranged in a rotor and a rotating angular speed ω of the dynamo-electric machine. That is, when the rotating angular speed ω (rotating speed) of the dynamo-electric machine is increased, the induced electromotive force is proportionally increased.

Accordingly, high torque can be obtained in a low-speed range, but operation in a high-speed range is difficult because the variable range of rotating speed is narrow. Therefore, it may be considered that the high-speed operation range is widened using a field weakening control technology.

Further, the mechanism which uses the centrifugal force by the spring and the governor is disclosed in the Japnese Patent application Laid-open No. 2000-155262 as a method of weakening the field by the magnetic flux generated by permanent magnets.

The method of widening the high speed operation range using the field weakening control technology described above has limitations of heat generation and efficiency decrease due to weakening field current.

Further, the structure of the spring and the governor becomes complex in the method disclosed in the Japanese Patent Application No. 2000-155262.

SUMMARY OF THE INVENTION

An object of the present invention is to provide a dynamo-electric machine, in which the field weakening of magnetic flux generated by permanent magnets becomes possible by an simple structure.

Further, another object of the present invention is to provide a transport system which comprises the permanent magnet type dynamo-electric machine which can obtain the high torque characteristic in the low rotating speed region or at the start of the transport system and the high power characteristic in the high rotating speed region.

Acording to one aspect of the present invention, a dynamo-electric machine includes a stator having a primary winding and a rotor having a field magnet and a shaft. Wherein said field magnet comprises a first field magnet having diferent polarity magnetic poles sequentially arranged in a rotation direction and a second field magnet having diferent polarity magnetic poles sequentially arranged in a rotation direction. The dynamo-electric machine further comprises a mechanism for shifting the first and the second field magnets in axial and rotation directions.

Acording to another aspect of the present invention, a dynamo-electric machine includes a stator having a primary winding and a rotor having a field magnet and a shaft. Wherein said field magnet comprises a first field magnet having diferent polarity magnetic poles sequentially arranged in a rotation direction and a second field magnet having diferent polarity magnetic poles sequentially arranged in a rotation direction. The dynamo-electric machine further comprises a mechanism for shifting one field magnet in axial and rotation directions with respect to the other field magnet. Wherein a resultant magnetic field of the first field magnet and the second field magnet is changed.

Acording to further aspect of the present invention, a transport system comprises a dynamo-electric machine in which a resultant magnetic field of the first field magnet and the second field magnet is changed, comprising a stator with a primary winding and a rotor with a field magnet and a shaft. Said field magnet includes a first field magnet having diferent polarity magnetic poles sequentially arranged in a rotation direction and a second field magnet having diferent polarity magnetic poles sequentially arranged in a rotation direction. Said dynamo-electric machine further comprises a mechanism for shifting one field magnet in axial and rotation directions with respect to the other field magnet; a truck of which a power source is said dynamo-electric machine; a current collector which takes the electric power from the outside to said truck; and a power converter for controlling the electric power of said dynamo-electric machine.

BRIEF DESCRIPTION OF THE DRAWINGS

FIGS. 2A and 2B are schematic views of dynamo-electric machine shown in FIG. 1.

FIGS. 3A and 3B are schematic views showing a case where the magnetic pole centers of equal-polarity of the rotor of the dynamo-electric machine in FIG. 1 is in phase.

FIGS. 4A and 4B are schematic views showing a case where magnetic pole centers of equal-polarity of the rotor of the dynamo-electric machine in FIG. 1 are out of phase.

FIG. 9 is a view showing the inside of the rotor of another embodiment of a dynamo-electric machine in accordance with the present invention.

FIG. 10 is a view showing the inside of a rotor of another embodiment of a dynamo-electric machine in accordance with the present invention.

FIG. 13A–13D is an illustration FIGS. 13A–13D are illustrations of the method of measuring the displacement in the axial direction of the dynamo-electric machine according to another embodiment of the present invention.

FIGS. 14A–14C are schematic views of the rotor of the dynamo-electric machine according to another embodiment of the present invention (eight pole machine).

FIGS. 18A–18D are illustrations used for the supplementary explanation of the dynamo-electric machine shown in FIG. 16.

FIGS. 19A–19D are illustrations used for the supplementary explanation of the dynamo-electric machine shown in FIG. 17.

FIGS. 20A–20C are views showing the dynamo-electric machine according to another embodiment of the present invention.

FIGS. 21A–21B are views showing the dynamo-electric machine according to another embodiment of the present invention.

DESCRIPTION OF THE PREFERRED EMBODIMENTS

Figures 1A, 1B:
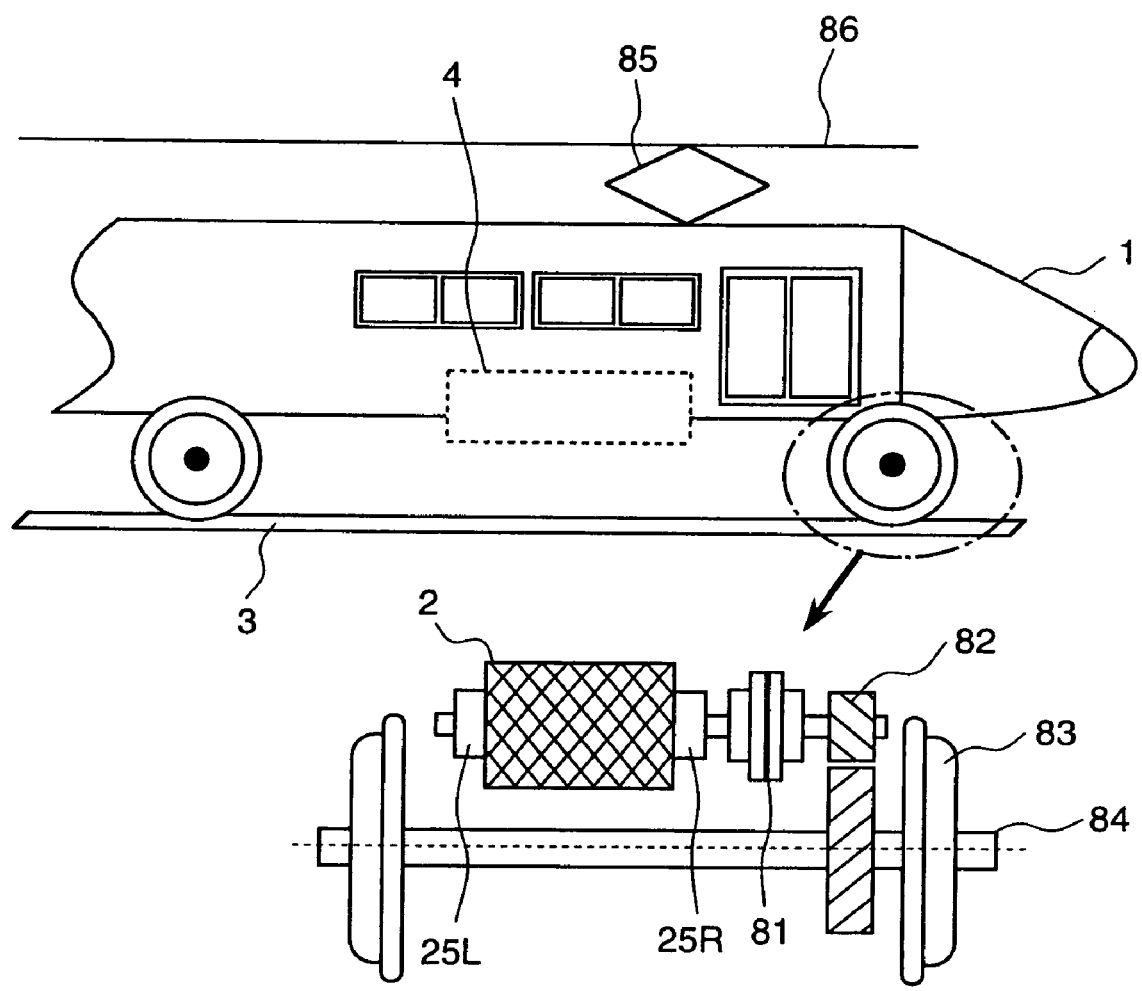
FIGS. 1A and 1B are views showing the layout of the dynamo-electric machine and the rolling stock according to an embodiment of the present invention.

Embodiments of the present invention will be explained.

FIG. 1 shows the arrangement layout of a permanent magnet type synchronous dynamo-electric machine according to an embodiment of the present invention.

There are various transport systems which use the dynamo-electric machine as a power source. FIG. 1 shows the embodiment of a railway rolling stock system as one example of the transport system.

The railway rolling stock system shown in FIG. 1 has electric car 1, dynamo-electric machine 2, wheel 83 installed directly or indirectly on the dynamo-electric machine 2, power conversion machine 4 for controlling the electric power of dynamo-electric machine 2, and current collector 85.

Here, the electric car means the rolling stock which uses electricity as the power. Further, in the transport system including the rolling stock system, the electric car means a truck in a broad sense.

Further, the current collector is a device for taking the electric power outside the electric car (or the truck). The current collector is a pantograph for aerial wire type (86), and a collector in case of the third rail type. Further, the current collector of non-contact type is used for the transport system in the factory.

Dynamo-electric machine 2 shown in FIG. 1B has the structure to transmit the power to axle 84 through coupling 81 and cogwheel device 82. Machinism 25R and 25L by which stopper 24 shown in FIG. 2 is moved in parallel to the shaft necessary are provided at the righ and left of said dynamo-electric machine 2.

FIG. 2 schematically shows the case where the centers of the same magnetic poles of the rotors of the dynamo-electric machine showm in FIG. 1 are out of alignment. Armature winding 11 is wound in the slots of the stator core 10, which is connected to housing 13 with cooling channel 12 through which refrigerant flows.

The rotor 20 of a permanent magnet embedded type is composed of a first rotor 20A fixed to a shaft 22 and a second rotor 20B separated from the shaft 22. Of course, the rotor may be a rotor of a surface magnet type instead of the rotor of a permanent magnet embedded type.

In the first rotor 20A, permanent magnets 21A are arranged so as to be alternatively aligned magnetic poles of different polarity in the rotation direction. Similarly, in the second rotor 20B, permanent magnets 21B are arranged so as to be alternatively aligned magnetic poles of different polarity in the rotation direction. The field magnets coaxially arranged in the two rotors of the first and the second rotors are opposite to magnetic poles of the stator.

A nut portion 23B is formed in the inner side of the second rotor 20B, and a bolt screw portion 20A to be in contact with the nut portion 23B is formed in the shaft. By connecting the second rotor 20B with the shaft with the screw function, the second rotor 20B is movable in the axial direction while being rotated with respect to the shaft.

Further, a stopper 24 is arranged at a position apart from the side surface of the second rotor 20B so that the second rotor 20B may not exceed a preset displacement from the center of the stator. Furthermore, by providing a servo-mechanism of an actuator 25 for driving the stopper to make the stopper movable in the direction of shaft axis, the displacement between the magnetic pole centers of the first field magnet and the second field magnet can be varied. As a result, it is possible to control the total effective magnetic flux composed of the first field magnet and the second field magnet to the stator having the armature windings in the slits.

Description will be made below on that the effective magnetic flux of the permanent magnets can be varied corresponding to the direction of torque by doing as described above.

In an dynamo-electric machine basically using armature windings in the stator and permanent magnets in the rotor, in the case that the rotation direction of the rotor is the same between when the dynamo-electric machine is working as a dynamo-electric machine and when working as a generator, the direction of the torque acting on the rotor becomes opposite between when the dynamo-electric machine is working as a dynamo-electric machine and when working as a generator.

On the other hand, in the case that the dynamo-electric machine is working as a dynamo-electric machine, the direction of the torque is reversed when the rotation direction of the rotor is reversed. Similarly, in the case that the dynamo-electric machine is working as a generator, the direction of the torque is reversed when the rotation direction of the rotor is reversed.

When the basic theory in regard to the rotation direction and the torque direction described above is applied to the embodiment of the dynamo-electric machine in accordance with the present invention, the following can be said.

When the dynamo-electric machine is operated in a middle and low rotating speed range of the start of the rolling stock car or the truck of the transport system, high torque characteristic can be obtained by making the centers of equal-polarity magnetic poles of the first rotor 20A and the second rotor 20B are made in phase to increase the effective magnetic flux by the stator magnetic poles and the opposite permanent magnets, as shown in FIG. 4.

Next, when the dynamo-electric machine is operated in a high rotating speed range of the defrosting operation, the centers of equal-polarity of the first rotor 20A and the second rotor 20A are brought out of phase while the second rotor 20B is being moved with respect to the shaft 22 to widen the gap between the first rotor 20A and the second rotor 20A as if the nut portion were screwed off from the bolt screw portion, as shown in FIG. 5. Therefore, the effective magnetic flux by the stator magnetic poles and the opposite permanent magnets is decreased. In other words, there is the weakening magnetic field effect, and accordingly a high output power characteristic can be obtained in the high rotating range.

FIG. 4 schematically shows the state that the effective magnetic flux by the stator magnetic poles and the opposite permanent magnets is decreased by making the centers of equal-polarity of the first rotor 20A and the second rotor 20A out of phase while the gap between the first rotor 20A and the second rotor 20A is being widened.

In FIGS. 3 and 4, there are associative illustrations of a head portion 61 of a bolt, a bolt screw portion 60 and a nut portion 62. The head portion 61 of the bolt corresponds to the first rotor 20A, the nut portion 62 corresponds to the second rotor 20B. When the bolt screw portion 60 (corresponding to the part 23A in FIG. 2) is rotating a direction, the nut portion 62 is fastened or unfastened depending on the direction of torque acting on the nut portion 62. The similar phenomenon occurs in the second rotor 20B depending on the direction of torque acting on the rotor.

Description will be made below on operation of the induced electromotive force by the dynamo-electric machine in accordance with the present invention.

FIG. 5 shows the characteristics of the effective flux, the induced electromotive force and the terminal voltage versus the angular rotating speed of the permanent magnet synchronous dynamo-electric machine.

Figure 5A:
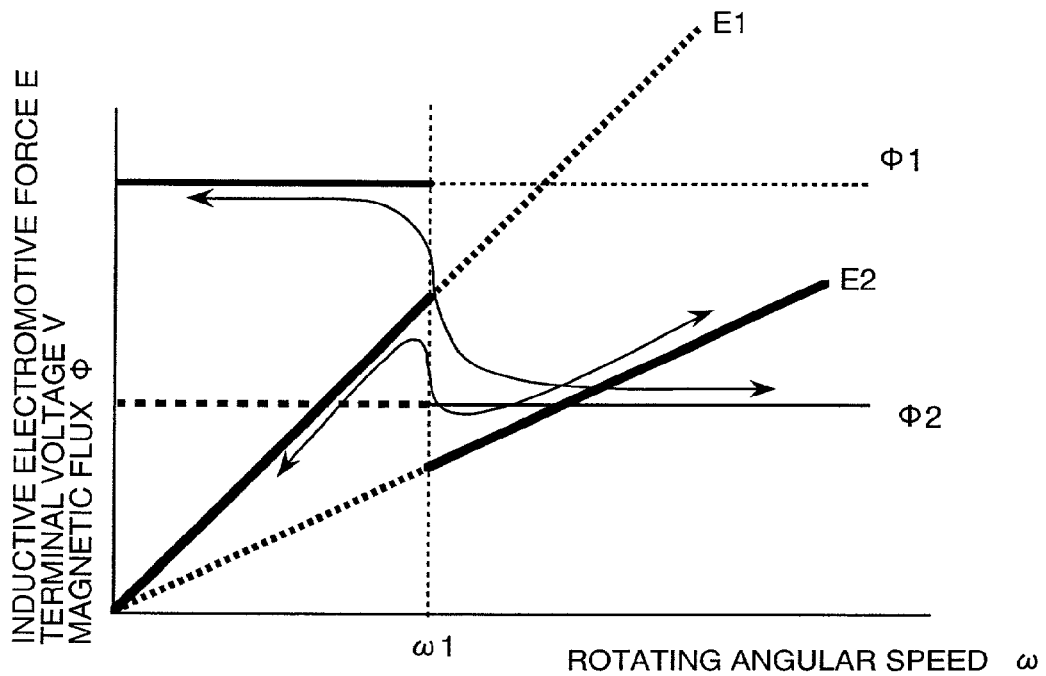
FIG. 5 is graphs showing various kinds of characteristics versus rotating speed of the dynamo-electric machine in FIG. 1.

The induced electromotive force E is determined by a constant magnetic flux Φ generated by the permanent magnets arranged in the rotor and an angular rotating speed ω of the dynamo-electric machine. That is, as shown in FIG. 5(a), if the constant magnetic flux Φ1 is constant, the induced electromotive force E1 is proportionally increased as the angular rotating speed ω (rotating speed) is increased. However, since there is a limitation in the output voltage of the inverter due to the terminal voltage of the power supply and the capacity of the inverter, there is also a limitation in the induced electromotive force generated by the dynamo-electric machine under a normal operating condition. Therefore, in the permanent magnet synchronous dynamo-electric machine, it is necessary in a range above a rotating speed to perform what is called the field weakening control in order to reduce the magnetic flux generated by the permanent magnets.

Since the induced electromotive force is increased in proportion to the angular rotating speed, the current of the field weakening control must be increased. Therefore, a large current needs to be conducted to the coil of primary conductor, and consequently the heat generated in the coil is increased, which may result reducing of the efficiency as a dynamo-electric machine in a high rotating speed range and demagnetization of the permanent magnets due to heat generation exceeding the cooling capacity.

For example, as shown in FIG. 5(a), when the magnetic flux Φ1 generated by the permanent magnets arranged in the rotor is changed to the magnetic flux Φ2 at a point of the angular rotating speed ω1 (rotating speed), the induced electromotive force E1 of the dynamo-electric machine is changed to the induced electromotive force E2. By this characteristic, the maximum value of the induced electromotive force can be limited.

Figure 5B:
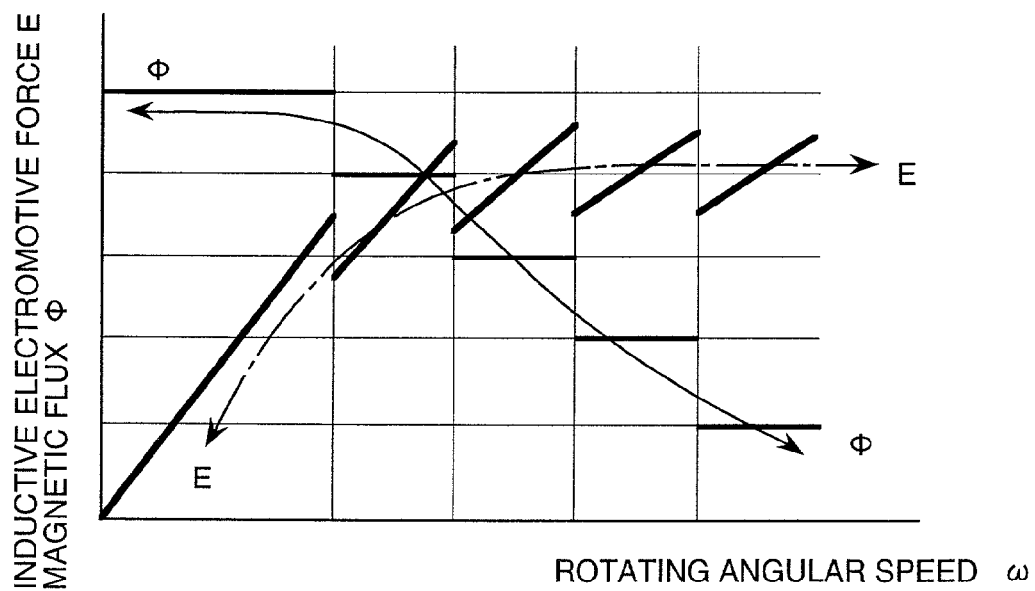

Similarly, FIG. 5(b) is a schematic graph showing that when the magnetic flux Φ is changed little by little corresponding to the angular rotating speed ω (rotating speed), the induced electromotive force E can be maintained constant.

In an embodiment of a means for obtaining the characteristics shown in FIG. 5(b), the first field magnet of a dynamo-electric machine is fixed to a shaft, and the second field magnet is separated from the shaft. The shaft and the second field magnet have screw functions to be connected to each other by forming a bolt screw portion in the shaft and a nut portion inside the second field magnet. Further, a stopper is provided at a position apart from a side surface of the second field magnet, and a servo mechanism capable of moving the stopper in parallel to the shaft according to a rotating speed is provided.

Figure 6:
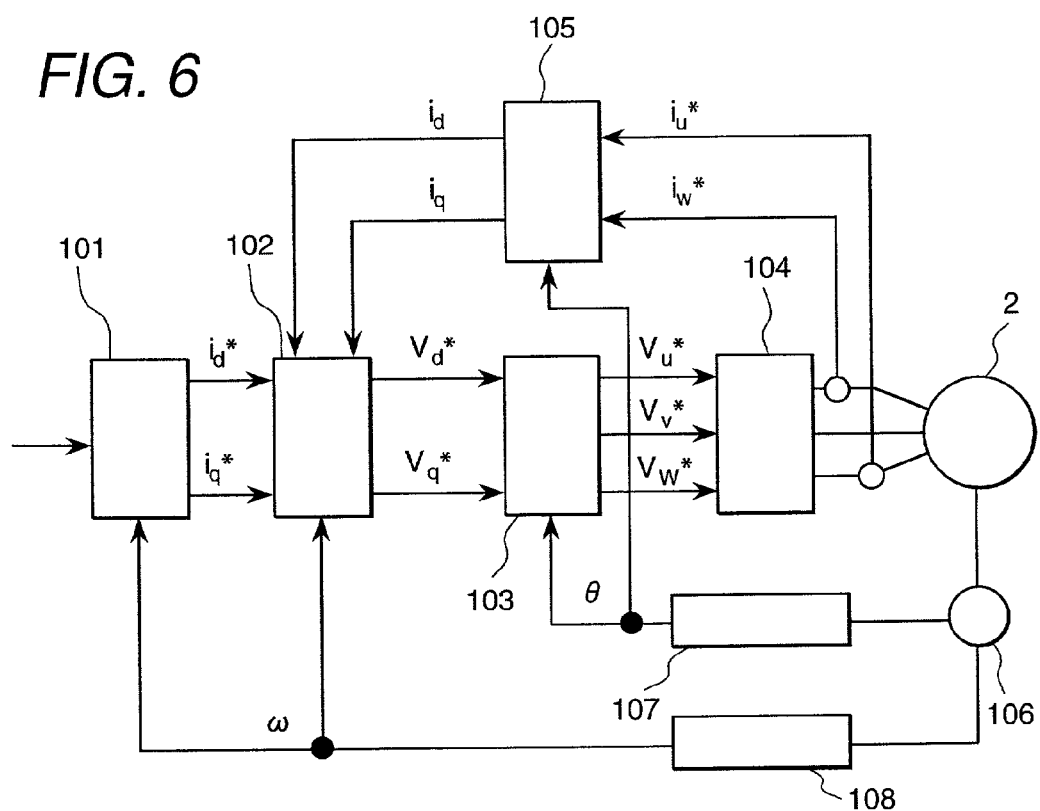
FIG. 6 is a control block diagram of the dynamo-electric machine in FIG. 1.

FIG. 6 is a control block diagram of the dynamo-electric machine shown in FIG. 1.

First of all, drive judgment part 101 judges the drive operation of permanent magnet type synchronous dynamo-electric machine 2 based on the information (compression machine pressure, gas temperature, operation modes, and fuel gas throttle opening, etc.) from the sensor installed alone the turbine controller and the rotating speed of permanent magnet type synchronous dynamo-electric machine 2, and outputs the electric current command value. The electric current command value output from the drive judgment part 101 is input to current control block 102 which performs the decoupling control for the difference between the current command value and the present value of the current of permanent magnet type synchronous dynamo-electric machine 2.

The power output from the electric current control block 102 is converted into the three-phase alternating current in rotational coordinate transformation part 103, and given to permanent magnet type synchronous dynamo-electric machine 2 as a control signal through main PWM inverter circuit 104. Further, the electric current of each phase of permanent magnet type synchronous dynamo-electric machine 2(at least two-phase electric current) and the rotating speed (The rotating speed of the turbine is acceptable. Further, it is possible to use the multiplied value of the rotating speed of the turbine when there is a change gear.) are detected. The electric current of each phase is converted into two-axis currents in two axle conversion block 105, and fed back to the electric current command value. Further, the rotating speed and the position of magnetic pole, etc. are detected by detector 106, and are fed back to each control block through magnetic pole position transducer 107 and velocity transformation part 108.

Although the current sensor, and the position and speed sensor of dynamo-electric machine 2 are provided in the embodiment shown in FIG. 6, a part of these sensors can be removed, and the sensor-less configuration of driving dynamo-electric machine 2 can be adopted in a similar way.

Although the embodiment of FIG. 6 comprises a position-and-speed sensor of the dynamo-electric machine 2 and a current sensor of the dynamo-electric machine, a control circuit of a sensor-less structure for driving the dynamo-electric machine 2 without part of these sensors may be applicable.

Further, since in the permanent magnet synchronous dynamo-electric machine of the present invention, the pole centers of equal-polarity of the first and the second rotors are brought in phase or out of phase corresponding to the operating condition, the permanent magnet synchronous dynamo-electric machine of the present invention has a function of correcting a lead angle of current supply by a controller for controlling the inverter corresponding to a positional shift angle of the composite magnetic pole of the first field magnet and the second field magnet.

An embodiment of correcting the lead angle of current supply will be described below.

When the dynamo-electric machine is operated by fixing the first field magnet to a shaft, by separating the second field magnet from the shaft, and by forming a bolt screw portion in the shaft and a nut portion inside the second field magnet to add screw functions to be connected to each other to the shaft and the second field magnet, the second filed magnet is moved in the axial direction while being rotated.

FIG. 13 shows the relationship between rotation angle and displacement in the axial direction when the pole centers of equal-polarity of the first rotor and the second rotor are in phase or out of phase corresponding to the operating condition.

Referring to FIG. 13, since there is a proportional relationship between the rotation angle θ and the axial displacement ΔL of the second rotor, the axial displacement ΔL is measured using a displacement meter 64, and fed back to the controller of the electric power converter to be used for optimum control to correct the lead angle of current supply as a converted value of the displacement angle of the composite magnetic pole position of the first field magnet and the second field magnet.

Figure 7:
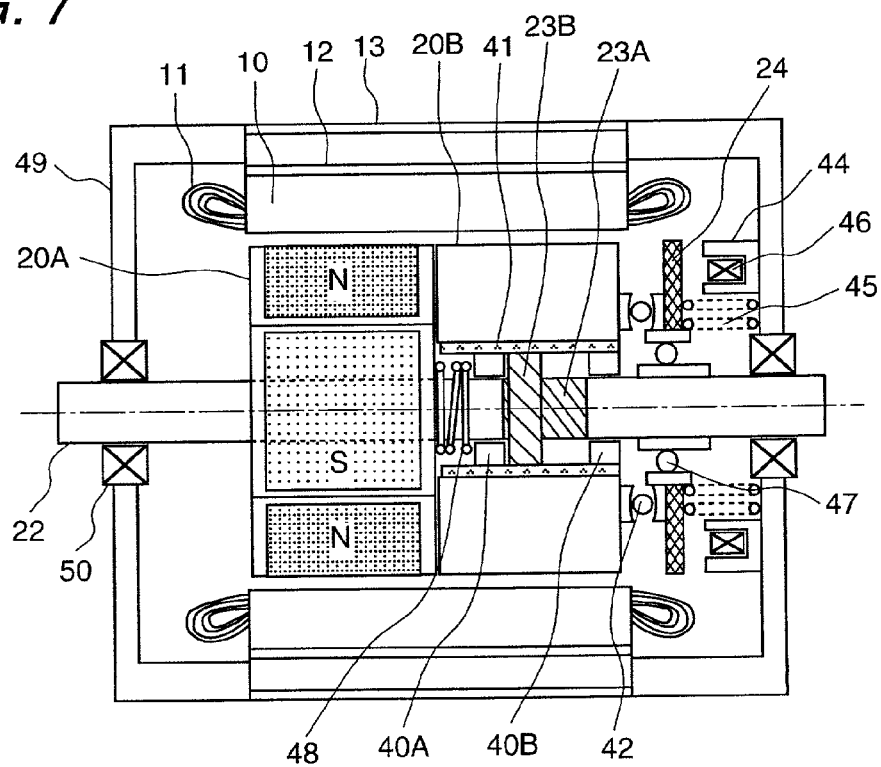
FIG. 7 is a view showing another embodiment of a dynamo-electric machine in accordance with the present invention (an actuator in OFF state).

FIG. 7 is a view showing another embodiment of a dynamo-electric machine in accordance with the present invention.

The first rotor 20A is fixed to the shaft 22, the second rotor 20B being separated from the shaft 22, the bolt screw portion 23A being formed in part of the shaft, a sleeve 41 being fixed to the inside of the second field magnet, the nut portion 23B being fixed to the inside of the sleeve 41. Thus, the second rotor 20B is rotated with respect to the first rotor 20A while the gap between the first rotor 20A and the second rotor 20B is being widened as if a nut portion were screwed off from a bolt screw portion.

When change in flux linkage occurs between the inside of the second field magnet and the shaft 22 as the second rotor is rotated because there is a small play between the second field magnet and the shaft 22, a trouble such as electrolytic corrosion may occur. Therefore, the sleeve 41 is made of a non-magnetic material having an electric resistivity higher than that of iron. By doing so, the inside of the second field magnet and the shaft 22 are magnetically and electrically insulated by the sleeve 41.

Supporting mechanisms 40A, 40B are arranged inside the sleeve 41 so as to guide rotating motion, reciprocal motion and the composite motion between the second field magnet and the shaft.

The second rotor 20B is connected to the shaft by forming a screw function of the bolt screw portion 23A in part of the shaft, and a movable stopper 24 is arranged at a position apart from a side surface of the second field magnet, and supporting mechanisms 42, 47 are arranged between the stopper 24 and the shaft, and between the stopper and the side surface of the second rotor 20B so as to guide rotating motion, reciprocal motion and the composite motion between the second rotor with respect to the shaft. The supporting mechanism 42 has a function of a thrust bearing, and the supporting mechanism 47 has a function of guiding the rotating motion, the reciprocal motion and the composite motion though it is a radial bearing.

Further, there is an effect that the function of the supporting mechanism 42 is improved as the thrust bearing by arranging a spring 48.

Description will be made below on a magnetic clutch as an example of the servomechanism capable of moving the stopper 24 in parallel to the shaft.

The structure of the magnetic clutch is that a coil 46 is wound around a yoke 44, and a stopper 24 may also serve as a movable core. The yoke 44 and the coil 46 are fixed to a frame 49 of the dynamo-electric machine or to a part of the compressor, not shown, and a spring 45 is arranged between the yoke 44 and the stopper 24 so as to have a function of a reset device at braking excitation. A bearing 50 is arranged between the frame 49 and the shaft 22 to support the shaft 22.

Figure 8:
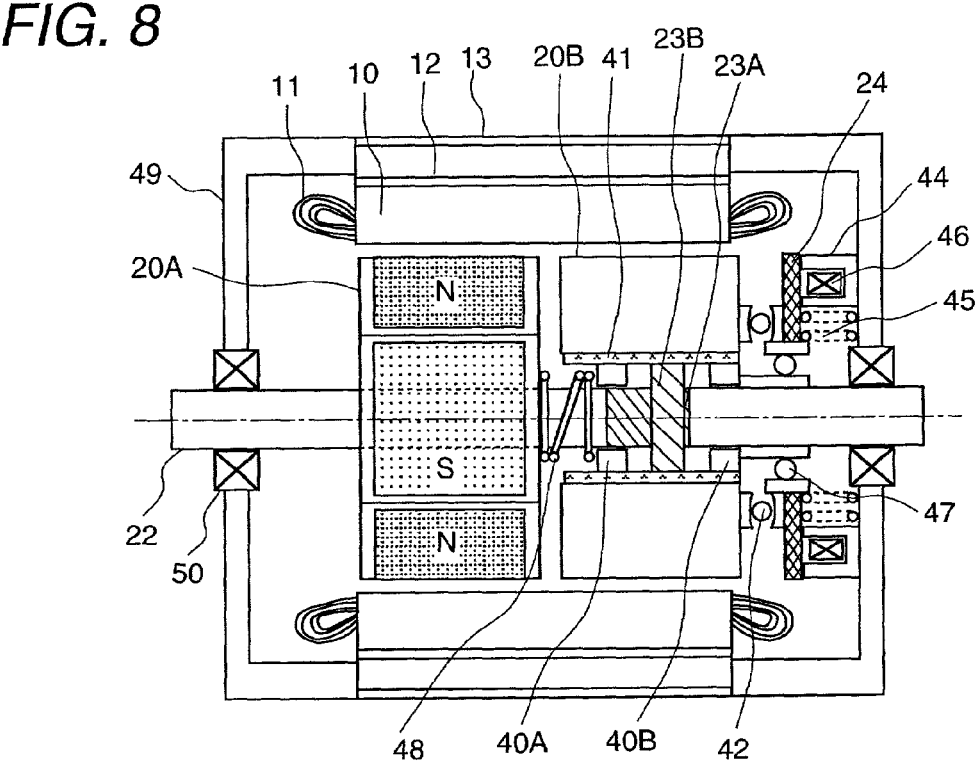
FIG. 8 is a view showing another embodiment of a dynamo-electric machine in accordance with the present invention (an actuator in ON state).

FIG. 7 shows the coil 46 under a non-excited state, and FIG. 8 shows the coil 46 under an excited state.

The yoke 44 becomes a strong magnet by exciting the coil 46 to attract the stopper 24 also having the function as the movable core.

When the stopper 24 is attracted by exciting the coil 46, burden of conducting current to the coil 46 can be reduced by adding torque to the second rotor 20B so as to be rotated with respect to the first rotor 20A while the gap between the first rotor 20A and the second rotor 20B is being widened as if a nut portion were screwed off from a bolt screw portion.

The magnetic clutch shown here is an example of a servo mechanism capable of moving the stopper 24 in parallel to the shaft, positioning of the stopper can be more accurately performed by employing a hydraulic actuator, a linear driving device using a rotor and a ball screw, a linear dynamo-electric machine or the like.

FIG. 9 shows an example of the sleeve 41 to be fixed to the inside of the second rotor 20B.

As one of methods of fixing the second rotor and the shaft, the second rotor 20B and the sleeve 41 are fixed by forming projected and depressed portions on the contact surfaces of the two parts. Difference in the structure of the inside portions between the first rotor 20A fixed to the shaft 22 and the second rotor 20B separated from the shaft 22 is shown in FIG. 10.

FIG. 10 shows another embodiment of the present invention.

A depressed portion 53 is formed on a side surface of the first field magnet where the first field magnet and the second field magnet are in contact with each other, and a projected portion 54 also serving as the function of the sleeve is formed in the second field magnet. The projected portion 54 and the sleeve 41 may be formed in a unit. By doing so, a sufficient space for the sleeve 41 can be secured. Therefore, this is one of methods of obtaining a dynamo-electric machine having the second rotor of a thin axial thickness by effectively arranging the spring 48, the supporting mechanisms 40A, 40B and the nut portion 23B.

Figure 11:
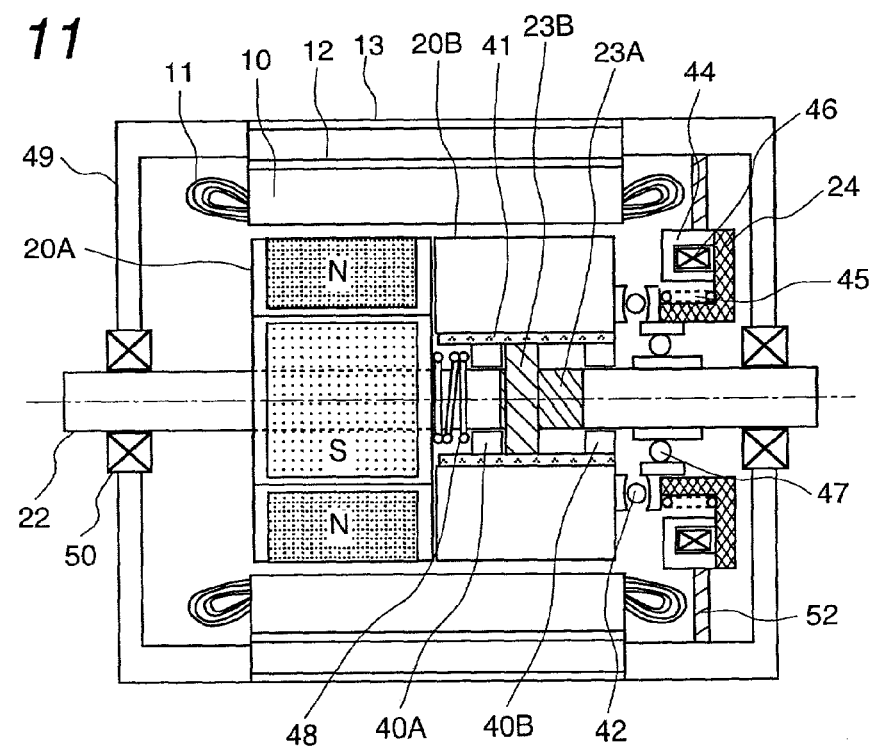
FIG. 11 is a view showing another embodiment of a dynamo-electric machine in accordance with the present invention (an actuator in ON state).

FIG. 11 shows another embodiment of the present invention.

Figure 12:
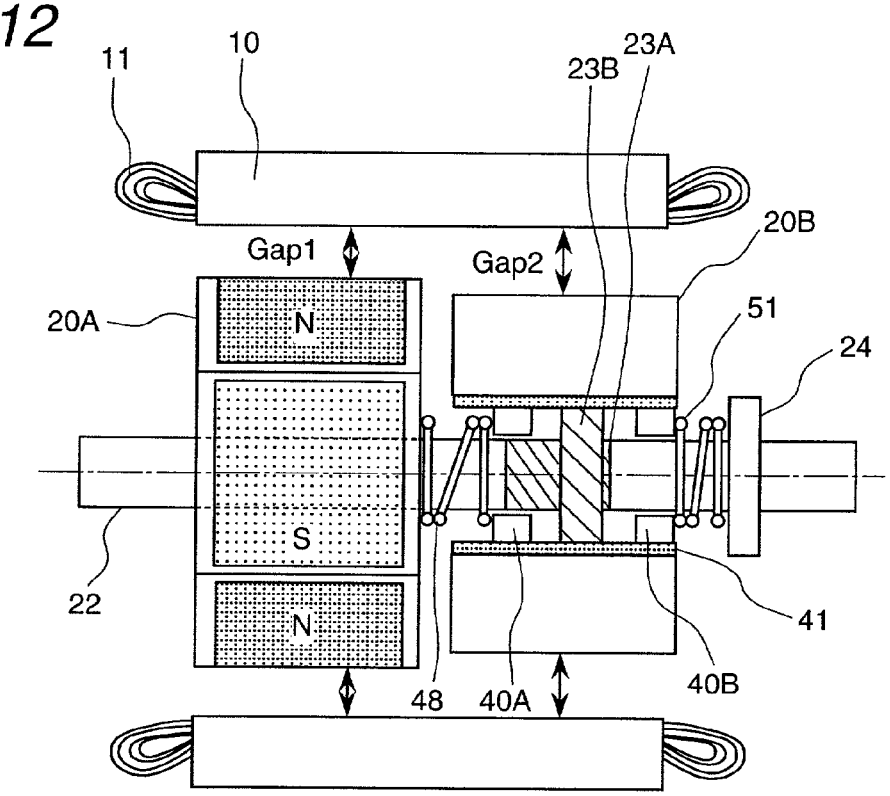
FIG. 12 is a schematic view of the rotor of the dynamo-electric machine according to another embodiment of the invention (There is a difference between gaps).

The basic components shown in FIG. 11 are the same as those of FIG. 7, but a part corresponding to the magnetic clutch is changed. FIG. 12 shows the coil 46 under the excited condition, and the yoke 44 is detached from the stopper 24 by the spring 45 at cutting off the excitation. Further, the embodiment has a characteristic that a thrust force is applied to the second rotor 20B by the screw function due to an interaction between the bolt screw portion 23A on which torque is applied and the nut portion 23B. Therefore, when the excitation of the coil 46 is cut off, the stopper 24 is detached from the yoke 44 by adding the thrust force to push out the stopper 24 due to the interaction between the screw and the torque. The yoke 44 is fixed to the frame 49 through an arm 52, or to a part of the truck body (not shown).

Similarly to FIGS. 7 and 8, the magnetic clutch shown in FIG. 11 is an example of a servo mechanism capable of moving the stopper 24 in parallel to the shaft, positioning of the stopper can be more accurately performed by employing a hydraulic actuator, a linear driving device using a rotor and a ball screw, a linear dynamo-electric machine or the like.

FIG. 12 shows another embodiment of the present invention.

The motor in accordance with the present invention is characterized by that the first rotor 20A is firmly fixed to the shaft 22, but the second rotor 20B has freedom to the shaft. Therefore, there is a small play in the mechanical dimension between the second rotor 20B and the shaft 22, and accordingly the second rotor 20B may become eccentric when large torque or a centrifugal force is applied to the second rotor 20B. The air gap 2 between the second rotor 20B having the second field magnet and the stator is made larger than the air gap 1 between the first rotor 20A having the first field magnet and the stator. By doing so, the mechanical contact between the second rotor 20B and the stator caused by decentering can be prevented.

Figure 15:
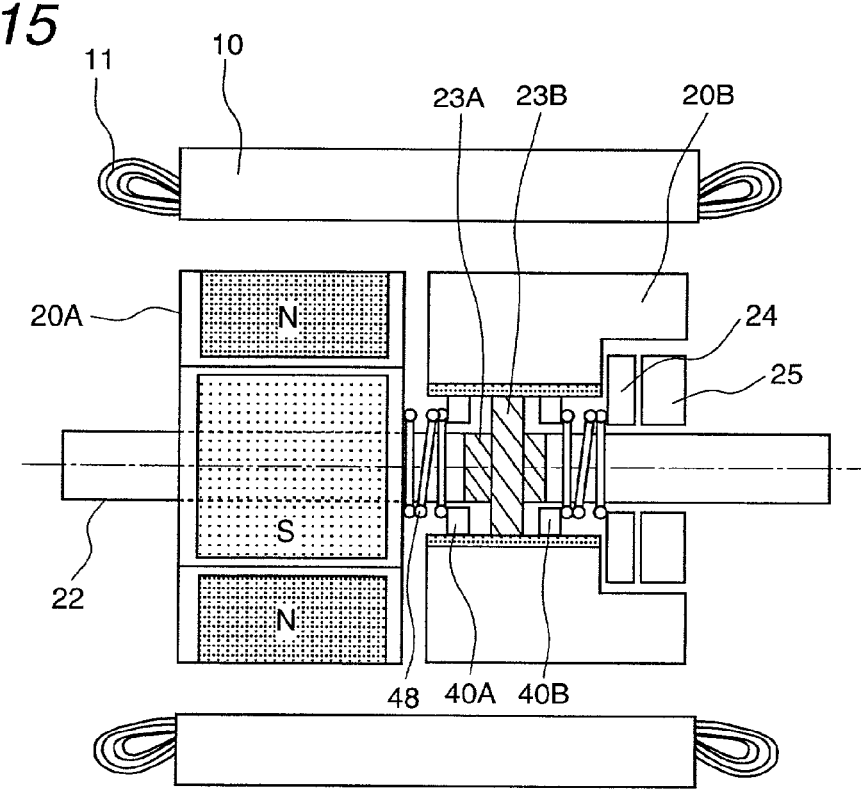
FIG. 15 is a schematic view of the rotor of the dynamo-electric machine according to another embodiment of the present invention (The stopper is provided inside the second rotor).

FIG. 15 shows a dynamo-electric machine according to another embodiment of the present invention.

The feature of the dynamo-electric machine of the present invention is in that the length of the inside is shorter than that of the outside of the second rotor 20B, and stopper 24 and servomechanism 25 (an actuator for driving the stopper) is provided inside the second rotor 20B. Therefore, the length of the entire rotor including stopper 24 and servomechanism 25 can be suppressed in a axial direction.

Although the above explanation of the present invention has been made on the four-pole dynamo-electric machine, there is no need to say that the present invention can be applied to a two-pole dynamo-electric machine or a six-pole dynamo-electric machine. As an example, FIG. 14 is a schematic view showing a rotor of a permanent magnet synchronous dynamo-electric machine in which the present invention is applied to an eight-pole dynamo-electric machine. Further, the present invention can be applied to any type of rotor, an embedded magnet type or a surface magnet type.

Figure 16:
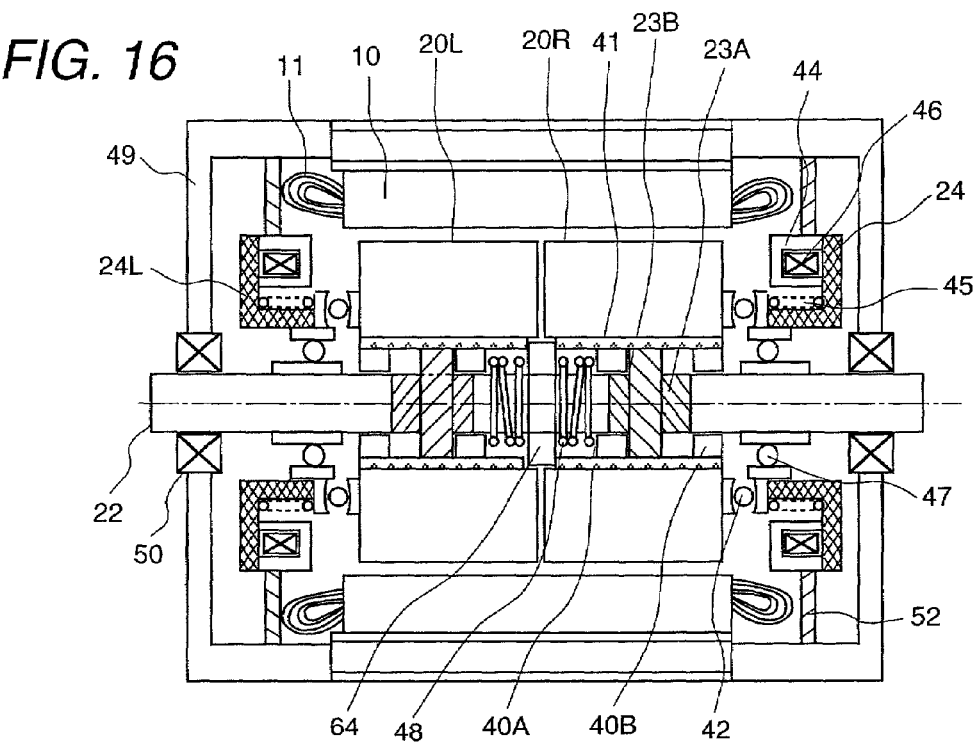
FIG. 16 is a view showing the dynamo-electric machine according to another embodiment of the present invention (Both field magnets have the mechanism for displacing in the axially and rotation directions).

The dynamo-electric machine according to another embodiment of the present invention is shown in FIG. 16.

The dynamo-electric machine shown in FIG. 16 comprises a stator having the primary winding, and a rotor having the field magnets and the shaft. Said field magnet has the first field magnet having different polarity magnetic poles sequentially arranged in a rotation direction the second field magnet having different polarity magnetic poles sequentially arranged in a rotation direction. Both field magnets have the mechanism for shifting in axial and rotation directions.

While the mechanism for shifting one field magnet with respect to the other magnet have the configuration in which one field magnet is fixed to the shaft in the dynamo-electric machine, and the other field magnet is installed movably and freely for the shaft in the dynamo-electric machine shown in FIG. 11, both of the field magnets in the dynamo-electric machine shown in FIG. 16 have the mechanism for shifting in axial and rotation directions as described before.

In FIG. 16, central stopper 64 is provided to shaft 22 between both field magnets. This central stopper has a function of suppression of the displacement of both field magnets to the right and left. FIG. 8 is a view similar to FIGS. 3 and 4, and shows the relationsip between a bolt and nuts to illustrate the above-mentioned suppression function.

In FIG. 18(1), the pole centers of equal-polarity of the right and left nuts are in phase through central stopper 64. One nut screws off outside when the torque is applied to the right and left nuts in the same direction.

Therefore, in a rolling stock system which uses the dynamo-electric machine in which the rotation directions in the go and return are reverse to each other, when the high torque characteristic is demanded in the low rotating speed region such as the star of the electric rolling stock, etc, the righ and left field magnets are compulsorily aligned as shown in FIG. 18B. Further, when the high torque characteristic is demanded in the high rotating speed region, the right and left stoppers 24 is allowed to be movable as occasion arised as shown in FIGS. 18C and 18D. As a result, a resultant magnetic field by both field magnets can be changed by moving stopper 24, and the effect of field weakening is achieved.

Figure 17:
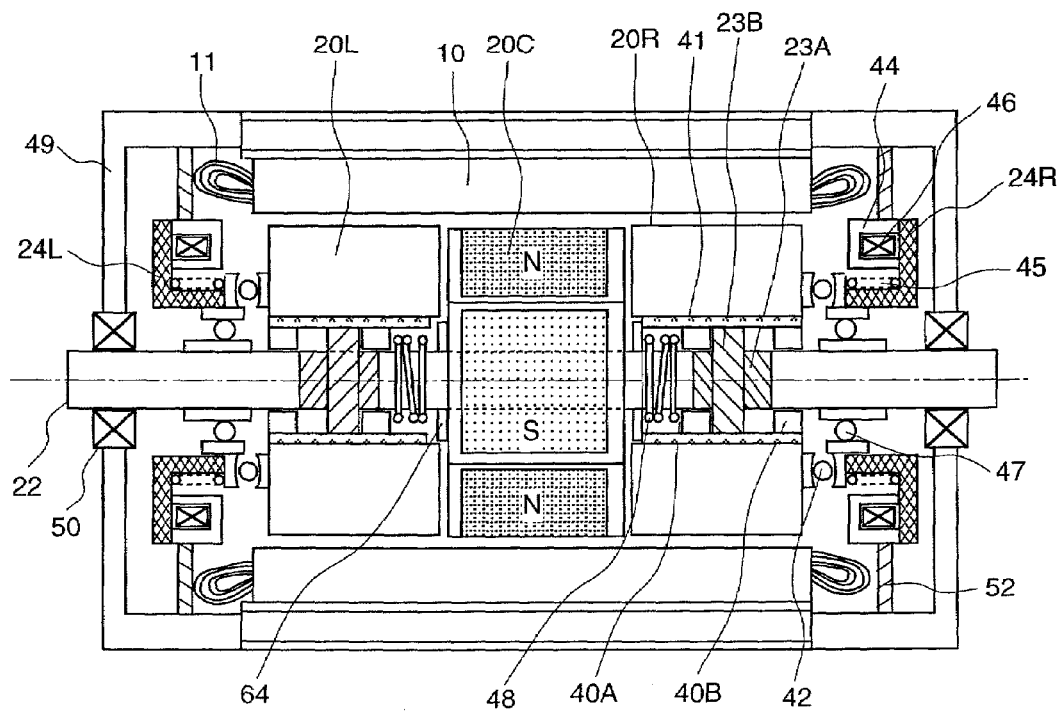
FIG. 17 is a view showing the dynamo-electric machine according to another embodiment of the present invention (The configuration having the first, the second and the third field magnets).

The dynamo-electric machine according to another embodiment of the present invention is shown in FIG. 17.

The dynamo-electric machine shown in FIG. 17 comprises a first field magnet having different polarity magnetic poles sequentially arranged in a rotation direction, a second field magnet having different polarity magnetic poles sequentially arranged in a rotation direction, and a third field magnet arranged between the first and second field magnets, having different polarity magnetic poles sequentially arranged in a rotation direction. In the basic configuration, the third field magnet 20c is fixed to shaft 22 and arranged at the center of a rotor, in addition to the configuration shown in FIG. 16. The width of the first field magnet and the second field magnet axially is the same as FIG. 16.

FIG. 16 and FIG. 18 are similar explanatory drawings. FIG. 19 shows an example of making the rotor part of FIG. 17 correspond to the bolt and the nut. A basic operation principle of the configuration shown in FIG. 19 is similar to FIG. 18.

In the dynamo-electric machines shown in FIGS. 16 to 19, the first field magnet and the second field magnet can move freely with respect to the shaft in axial and rotation directions. The screw functions are provided by forming a screw portion in the shaft and nut portions inside the first and the second field magnets.

A dynamo-electric machine according to another embodiment of the present invention is shown in FIGS. 20 and 21.

FIGS. 20 and 21 show an example of the mechanism which switches the the rotation direction of the axle (power output axle) used when the the rotation direction of the dynamo-electric machine of the present invention is the same. This mechanism has gear 93 and clutch 90 to reverse the rotation as a means for switching the direction of the rotation of the power output axle. Even when the rotation direction of axle 84 in the go and return is reversed like the rolling stock, the rotation direction of the dynamo-electric machine of the present invention can be made the same by using such a mechanism.

In FIG. 21, if the the rotation direction of the dynamo-electric machine of the present invention is reversed when the the rotation direction of axle 84 is the same, a resultant magnetic field of both field magnets provided to rotor can be changed.

What is claimed is:

1. A dynamo-electric machine comprising:
    a stator having a winding, and
    a rotor having first and second field magnets, which have different, magnetic poles and which are arranged sequentially and alternately on a rotating shaft in a rotation direction, the first and second field magnets being opposed to the magnetic poles of said stator, wherein said first and second field magnets displace in an axial or the rotation direction of the rotating shaft according to the magnetic action force of said first and second field magnets and the direction of the torque generated in said rotor, and wherein in response to a first rotational direction and in response to an opposite rotational direction of said rotor, one of said first and said second field magnets displace in an axial direction of said rotating shaft and in a rotational direction while another of said first and said second field magnets is fixed, under a condition where said another of said first and said second field magnets is held on said rotating shaft.

2. The dynamo-electric machine according to claim 1, wherein the centers of the magnetic poles of said first and second field magnets are maintained in an alignment state when said rotor rotates in one direction or the other direction at a low speed, wherein said second field magnet is displaced with respect to said first field magnet with said first field magnet maintained when said rotor rotates in one direction at a high speed, and the centers of the magnetic poles of said first and second field magnets are shifted from the alignment state, and wherein said first field magnet is displaced with respect to said second field magnet with said second field magnet maintained when said rotor rotates in the other direction at a high speed, and the centers of the magnetic poles of said first and second field magnets are shifted from the alignment state.

3. The dynamo-electric machine according to claim 1, further comprising:

a mechanism that moves said first and second field magnets in an axial or the rotation direction of the rotating shaft according to the magnetic action force of said first and second field magnets and the direction of the torque generated in said rotor, and a mechanism that controls the movement of said first and second field magnets.

4. The dynamo-electric machine according to claim 3, wherein said movement mechanism is a screw mechanism comprising a nut mechanism installed in each of said first and second field magnets, and a bolt mechanism installed in said shaft, and wherein said first and second field magnets mate with said shaft so that said first and second field magnets may freely move on said shaft.

5. The dynamo-electric machine according to claim 3, wherein said movement control mechanism comprises a first control mechanism installed on said shaft between said first and second field magnets, a second control mechanism installed on the opposed side of said second field magnet with respect to said first field magnet, and a third control mechanism installed on the opposed side of said first field magnet with respect to said second field magnet, and wherein these control mechanisms can move along said shaft.

6. The dynamo-electric machine according to claim 5, further comprising:

springs to guide the movement of said first and second field magnets one of which is installed on the side of said second field magnet with respect to said first field magnet and the other is installed on the side of said first field magnet with respect to said second field magnet.

7. The dynamo-electric machine according to claim 1, further comprising:

a third field magnet;

wherein centers of the magnetic poles of said first to third field magnets are maintained in an alignment state when said rotor rotates in one direction or the other direction at a low speed, wherein said second field magnet is displaced with respect to said third field magnet with the centers of the magnetic poles of said first and third field magnets maintained in an alignment state when said rotor rotates in one direction at a high speed, and the centers of the magnetic poles of said second and third field magnets are shifted from the alignment state where the centers of the magnetic poles of said first to third field magnets are aligned, and wherein said first field magnet is displaced with respect to said third field magnet with the centers of the magnetic poles of said second and third field magnets maintained in an alignment state when said rotor rotates in the other direction at a high speed, and the centers of the magnetic poles of said first and third field magnets are shifted from the alignment state where the centers of the magnetic poles of said first to third field magnets are aligned.

8. The dynamo-electric machine according to claim 1, wherein an electric current to that advanced angle is amended according to the displacement of said first field magnet or the displacement of said second field magnet is supplied to said winding.

9. The dynamo-electric machine according to claim 1, wherein a support mechanism that guides the movement of said first and second field magnets is installed between said first and second field magnets and said shaft.

10. The dynamo-electric machine according to claim 1, wherein said first and second field magnets are installed on said shaft through, the sleeve insulated magnetically and electrically said shaft.

11. The dynamo-electric machine according to claim 10, wherein said sleeve is non-magnetic substance having higher electric resistance rate than iron.

12. A dynamo-electric machine comprising:

a stator having a winding, and a rotor having first and second field magnets, which have different, magnetic poles and which are arranged sequentially and alternately on a rotating shaft in a rotation direction, the first and second field magnets being opposed to the magnetic poles of said stator, wherein said first and second field magnets are arranged at both ends of a third field magnet fixed on said shaft displace in an axial or the rotation direction of the rotating shaft according to the magnetic action force of said first and second field magnets and the direction of the torque generated in said rotor, and wherein in response to a rotational direction of said rotor, one of said first and said second field magnets displace in an axial direction of said rotating shaft and in a rotational direction while another of said first and said second field magnets and said third filed magnet is fixed, under a condition where said another of said first and said second field magnets is held on said rotating shaft.

13. The dynamo-electric machine according to claim 12, further comprising:
- a mechanism that moves said first and second field magnets in an axial or the rotation direction of the rotating shaft according to the magnetic action force of said first to third field magnets and the direction of the torque generated in said rotor; and
- a mechanism that controls the movement of said first and second field magnets.

14. The dynamo-electric machine according to claim 13, wherein said movement mechanism is a screw mechanism comprising a nut mechanism installed in each of said first and second field magnets, and a bolt mechanism installed in said shaft, and wherein said first and second field magnets mate with said shaft so that said first and second field magnets may freely move on said shaft.

15. The dynamo-electric machine according to claim 13, wherein said movement control mechanism comprises one control mechanism installed on the opposed side of said second field magnet with respect to said first field magnet, and the other control mechanism installed on the opposed side of said first field magnet with respect to said second field magnet, and wherein these control mechanisms can move along said shaft.

16. The dynamo-electric machine according to claim 15, further comprising:
- springs to guide the movement of said first and second field magnets one of which is installed on the side of said second field magnet with respect to said first field magnet and the other is installed on the side of said first field magnet with respect to said second field magnet.

17. The dynamo-electric machine according to claim 12, wherein an electric current to that advanced angle is amended according to the displacement of said first field magnet or the displacement of said second field magnet is supplied to said winding.

18. The dynamo-electric machine according to claim 12, wherein a support mechanism that guides the movement of said first and second field magnets is installed between said first and second field magnets and said shaft.

19. The dynamo-electric machine according to claim 12, wherein said first and second field magnets are installed on said shaft through, the sleeve insulated magnetically and electrically said shaft.

* * * * *

UNITED STATES PATENT AND TRADEMARK OFFICE
CERTIFICATE OF CORRECTION

PATENT NO. : 6,975,055 B2 Page 1 of 1
APPLICATION NO. : 09/977384
DATED : December 13, 2005
INVENTOR(S) : Houng Joong Kim and Shigeta Ueda It is certified that error appears in the above-identified patent and that said Letters Patent is hereby corrected as shown below:

Title Page, Item (12), delete "Joong et al." and insert -- Kim et al. --.

Title Page, Item (75), delete, "Kim Hoong Joong" and insert -- Houng Joong KIM --

Signed and Sealed this

Third Day of April, 2007

JON W. DUDAS
*Director of the United States Patent and Trademark Office*